(12) United States Patent
Hall et al.

(10) Patent No.: US 12,297,906 B2
(45) Date of Patent: May 13, 2025

(54) ADJUSTABLE SHIFT FORK SYSTEM FOR EFFICIENT ASSEMBLY AND DISASSEMBLY OF A CLUTCH ASSEMBLY

(71) Applicant: Dana Heavy Vehicle Systems Group, LLC, Maumee, OH (US)

(72) Inventors: Justin Hall, Ottawa Lake, MI (US); Mark W. Leber, Holland, OH (US); Michael D. Cook, Holland, OH (US); Shane T. Smith, Sylvania, OH (US); Robert L. Vailliencourt, Wauseon, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 18/319,253

(22) Filed: May 17, 2023

(65) Prior Publication Data

US 2024/0384789 A1 Nov. 21, 2024

(51) Int. Cl.
*F16H 63/32* (2006.01)
*F16D 23/02* (2006.01)
*F16D 23/14* (2006.01)

(52) U.S. Cl.
CPC .......... *F16H 63/32* (2013.01); *F16D 23/02* (2013.01); *F16D 23/14* (2013.01); *F16D 2023/141* (2013.01); *F16H 2063/324* (2013.01)

(58) Field of Classification Search
CPC .... F16H 63/32; F16H 2063/324; F16D 23/02; F16D 23/14; F16D 2023/141
See application file for complete search history.

(56) References Cited

U.S. PATENT DOCUMENTS

| 2,242,026 A | * | 5/1941 | Fishburn | F16D 23/02 |
| | | | | 192/53.1 |
| 2,562,357 A | * | 7/1951 | Huebner, Jr. | F16D 47/06 |
| | | | | 192/53.35 |
| 2019/0152316 A1 | | 5/2019 | Wentz et al. | |
| 2019/0195290 A1 | | 6/2019 | Suzuki et al. | |

FOREIGN PATENT DOCUMENTS

| CN | 111255788 A | | 6/2020 |
| JP | 2006226502 A | * | 8/2006 |
| KR | 101411659 B1 | | 7/2014 |

OTHER PUBLICATIONS

JP-2006226502-A text (Year: 2006).*
Leber, M. et al., "Systems for Transmission," U.S. Appl. No. 17/654,044, filed Mar. 8, 2022, 20 pages.
Leber, M. et al., "Systems for Transmission," U.S. Appl. No. 17/808,061, filed Jun. 21, 2022, 29 pages.

* cited by examiner

*Primary Examiner* — Terence Boes
(74) *Attorney, Agent, or Firm* — McCoy Russell LLP

(57) ABSTRACT

Shift fork system and method. The shift fork system includes multiple fork guides that are removably coupled to a shift fork body. Each fork guide is configured to removably mate with a clutch assembly, including a hub, to enable the clutch assembly to be adjusted. Further, multiple attachment devices in the shift fork system are each be configured to releasably fix a position of one of the fork guides in relation to the clutch assembly.

19 Claims, 11 Drawing Sheets

ADJUSTABLE SHIFT FORK SYSTEM FOR EFFICIENT ASSEMBLY AND DISASSEMBLY OF A CLUTCH ASSEMBLY

TECHNICAL FIELD

The present description relates generally to a shift fork system for a transmission. More specifically, the present disclosure relates to an adjustable shift fork guide for the assembly and disassembly of a clutch.

BACKGROUND AND SUMMARY

Some vehicles include a transmission for a controlling power generated by an engine or motor. The transmission may include selectable gear ratios which may be engaged and disengaged using clutches to alter the transmission's output speed. Shift forks have been used to engage and disengage clutches, such as dog clutches.

Attempts have been made to reduce play in shift fork linkages. For instance, single piece shift forks have been used in certain clutch assemblies. The inventors have recognized several potential drawbacks with certain clutch actuation assemblies which utilize single piece shift forks. For instance, using a single piece shift fork can cause difficulties when installing the fork and may increase the overall size of the clutch assembly. Using detent elements in the clutch assembly may further complicate clutch installation. For example, in certain installation scenarios, the likelihood of the detent parts becoming dropped or lost is increased.

The issues described above may be addressed by a shift fork system. The shift fork system includes, in one example, multiple fork guides that are adjustably coupled to a shift fork body. Each fork guide, in a first position, mates with a clutch assembly, including a hub, and enables the clutch assembly to be adjusted. Further, multiple attachment devices, included in the system, are configured to releasably fix a position of one of the fork guides in relation to the clutch assembly. In this way, the clearance within the shift fork system is increased during installation of the clutch assembly by retracting the fork guides, allowing the clutch assembly (e.g., the hub and a sliding sleeve, for instance) to be efficiently installed.

In another example, the fork guides slidably attach to the shift fork body. Therefore, in such an example, in an extended position, the fork guides mate with a recess in the clutch assembly and in the retracted position, the fork guides are decoupled from the clutch assembly recess. In this way, the fork guides are able to be retracted, to create clearance during clutch assembly installation, and then extended into their operational position subsequent to clutch assembly installation. In this way, installation of the fork guide assembly may more efficiently unfold.

In yet another example, the clutch assembly includes multiple detents in the hub and components such as a spring and ball bearing may be positioned in the detents. Further, in such an example, these detents allow the play between a sliding sleeve and the hub to be reduced (e.g., eliminated). Still further, in such an example, the clutch assembly with the sliding sleeve and the hub may be assembled prior to installing the clutch assembly on a shaft. In this way, the chance of the detent components becoming dropped or lost during system installation is reduced. Consequently, the system's assembly process is further enhanced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
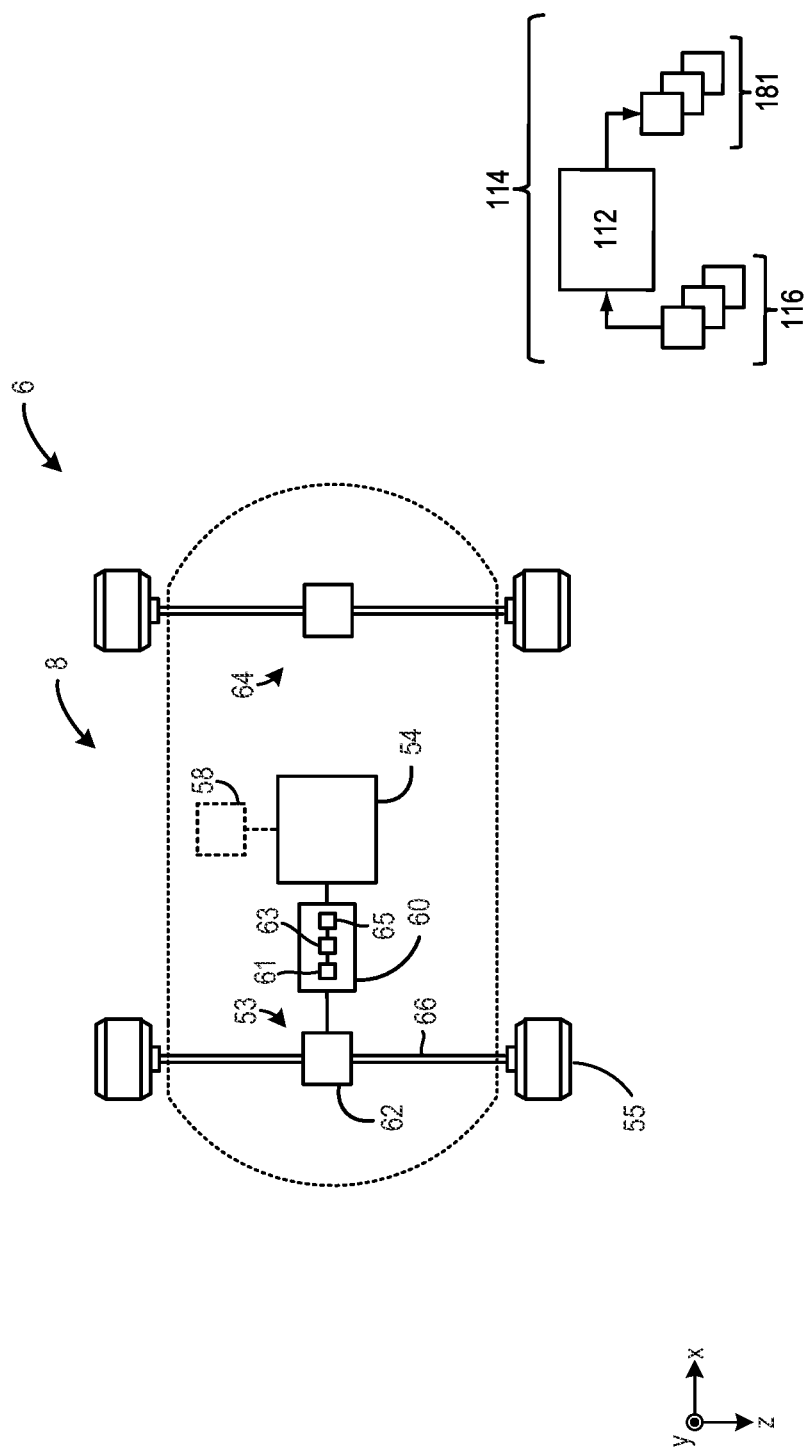
FIG. 1 shows an example of a vehicle system with a transmission.
Figure 2:
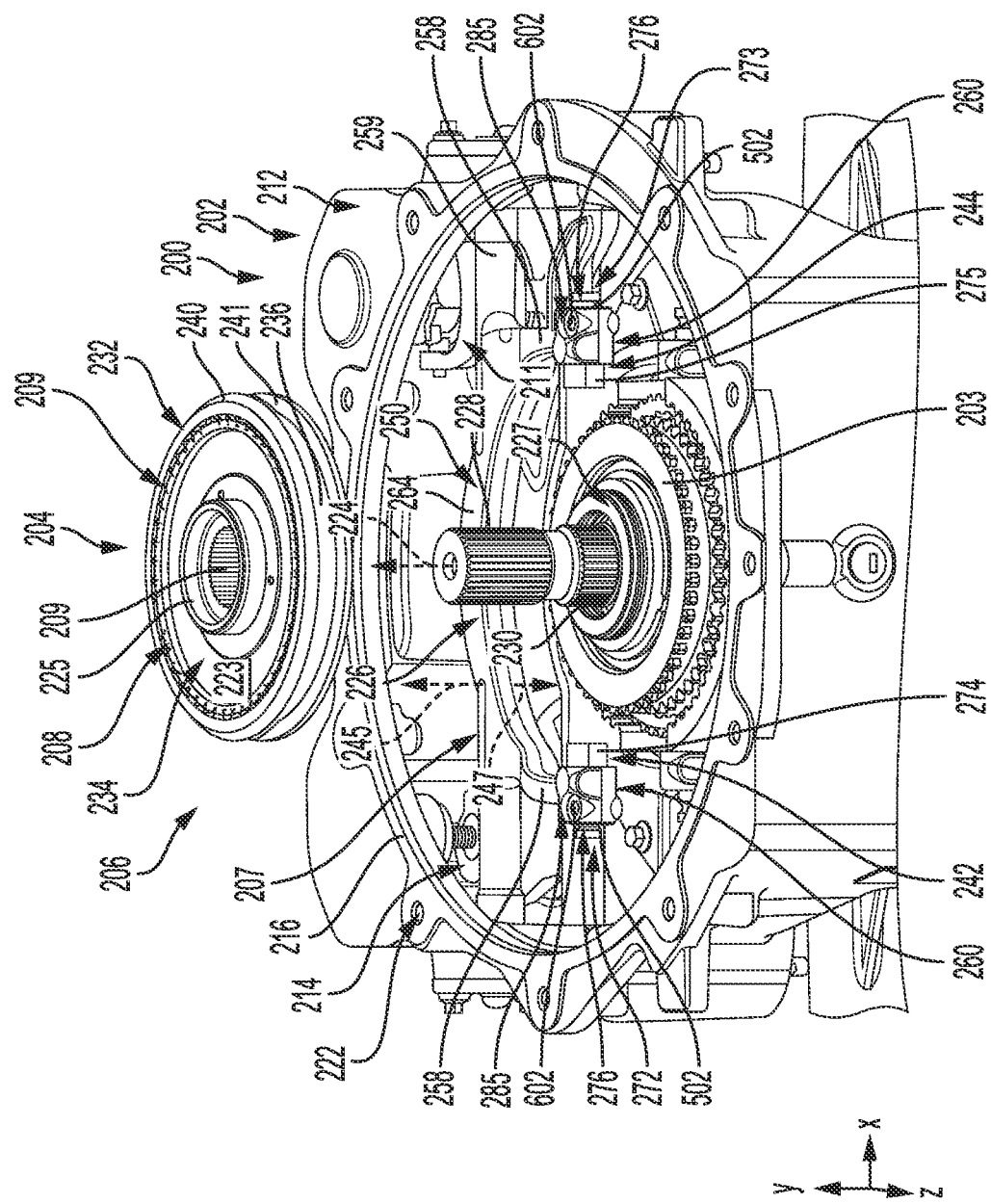
FIG. 2 shows an example of a transmission including a clutch assembly and a shift fork system in a disassembled state.
Figure 3:
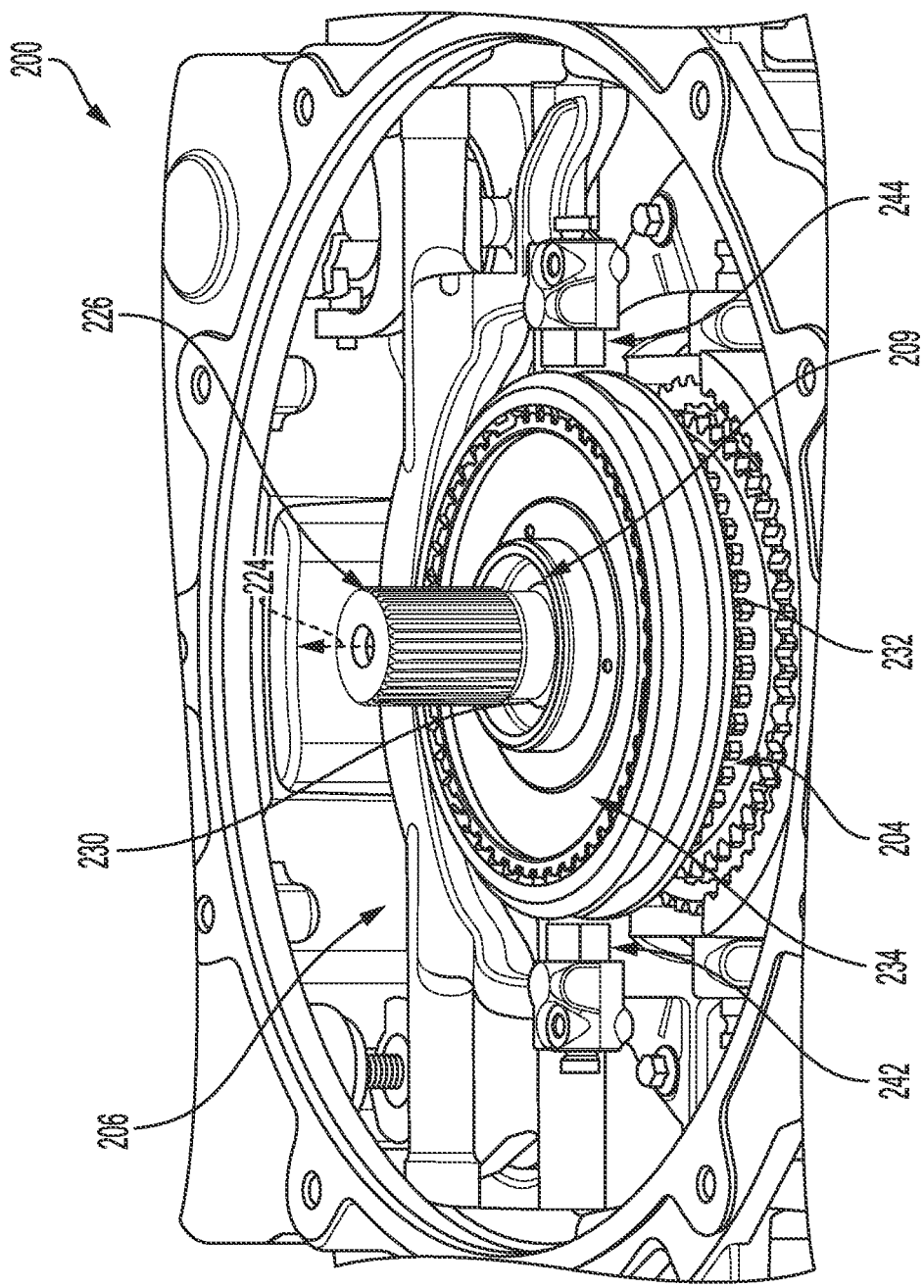
FIG. 3. shows the clutch assembly mated with a shaft of the transmission.
Figure 4:
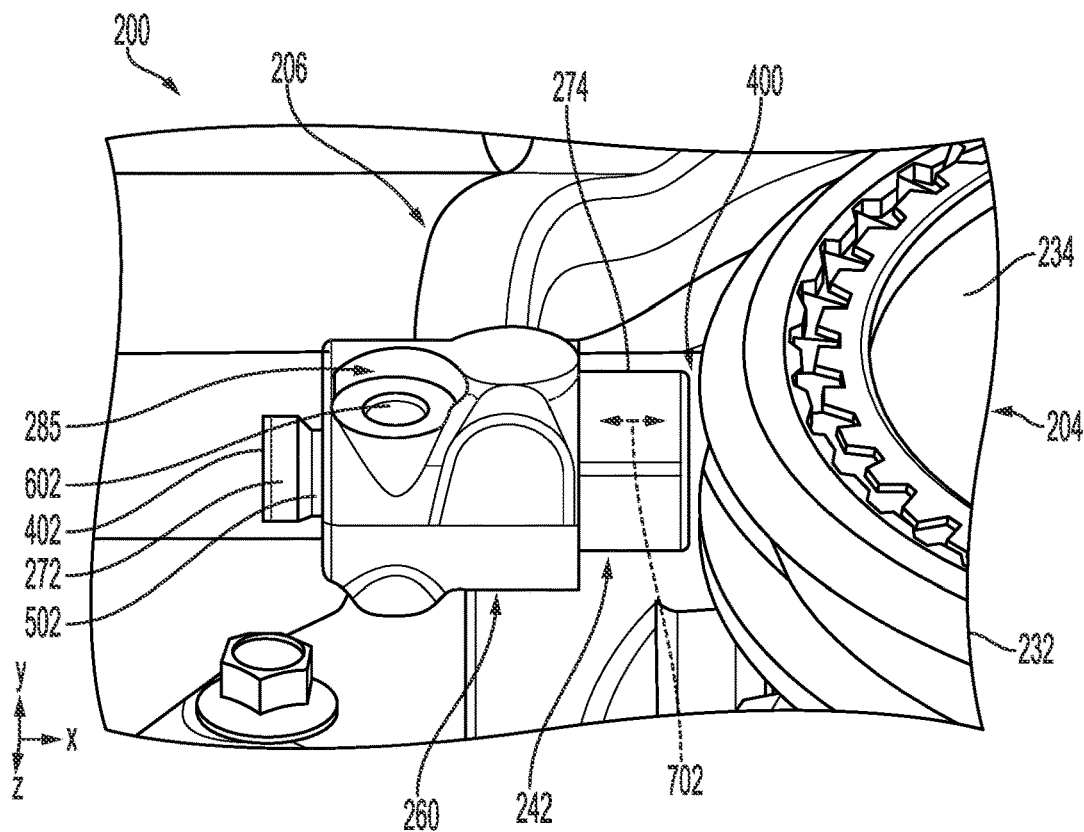
FIG. 4 shows a fork guide of the shift fork system in an assembly position.
Figure 5:
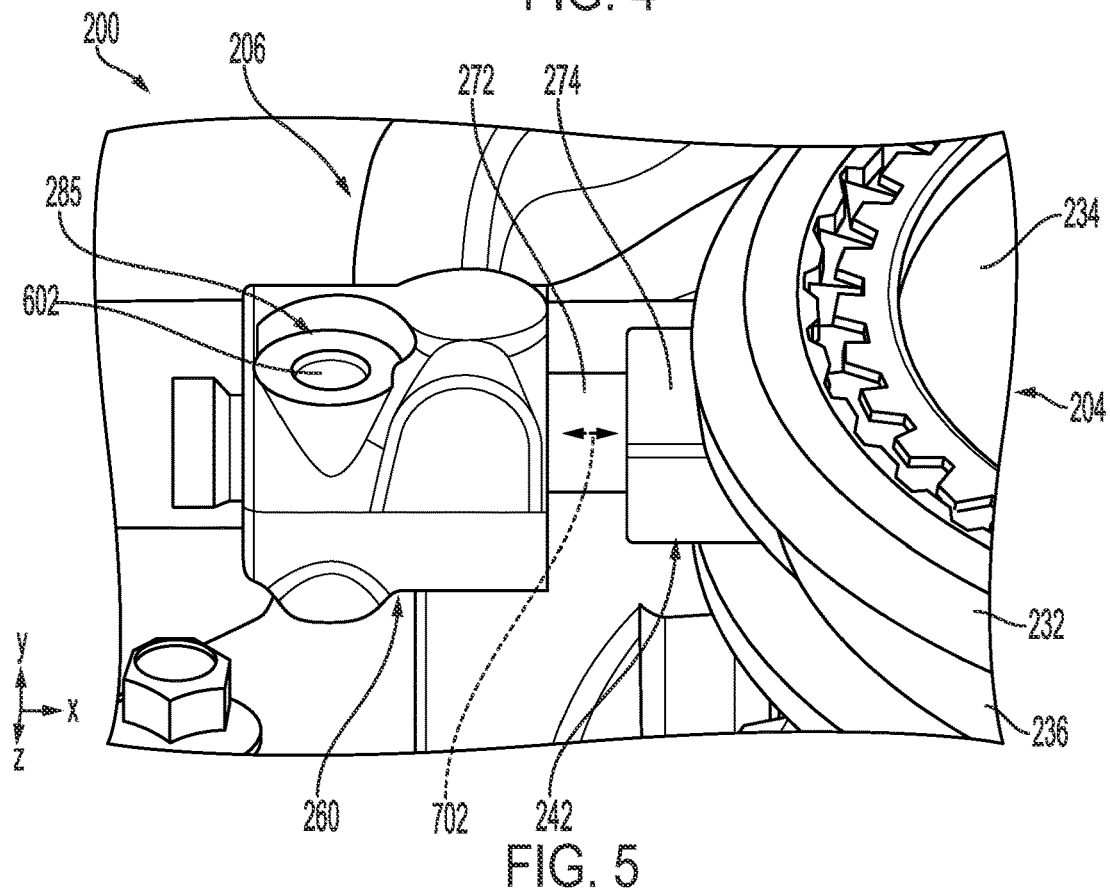
FIG. 5 shows the fork guide of FIG. 4 in an operating position.
Figure 6:
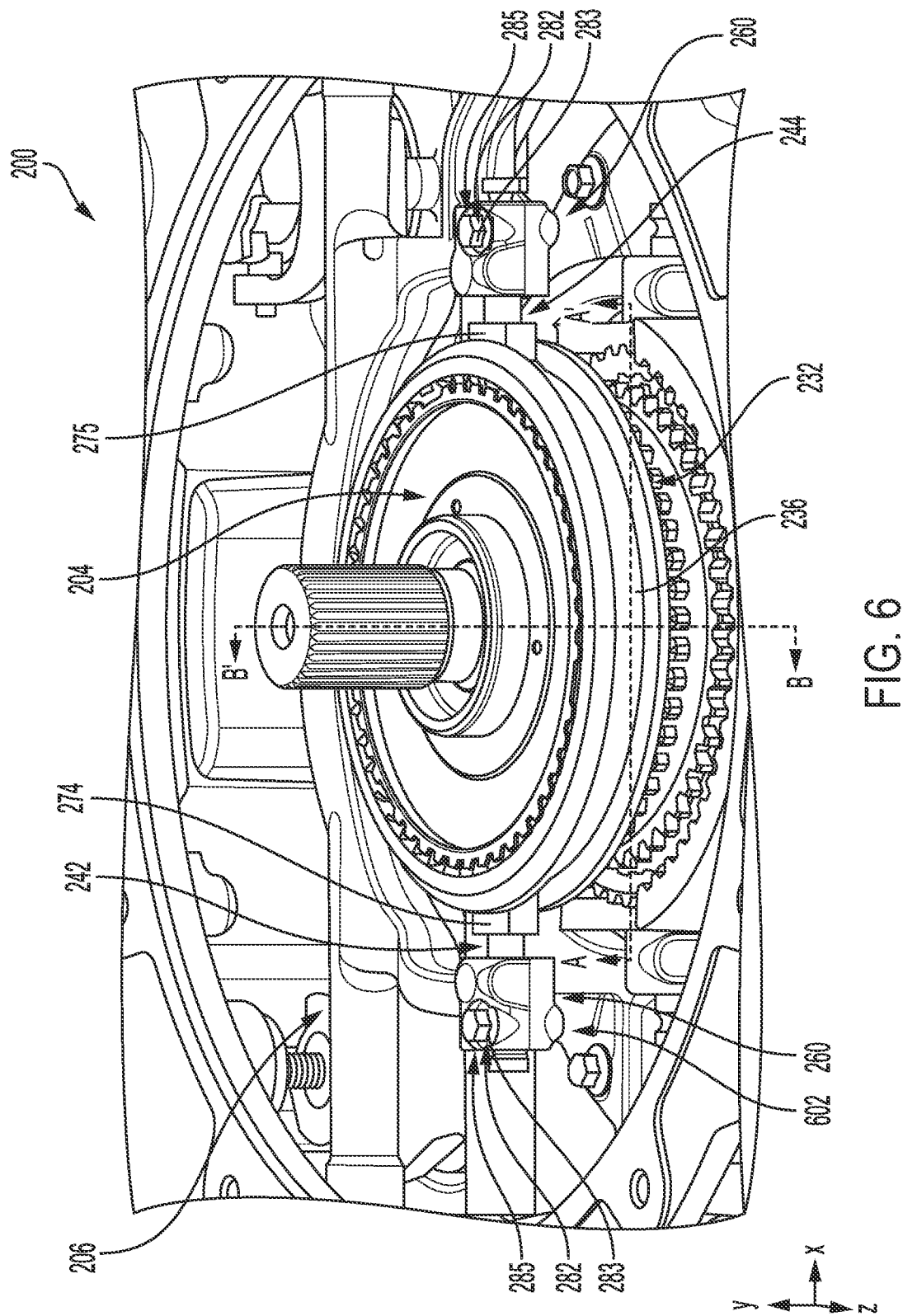
FIG. 6 shows the transmission with the fork guides in the shift fork system in an operating position.
Figure 7:
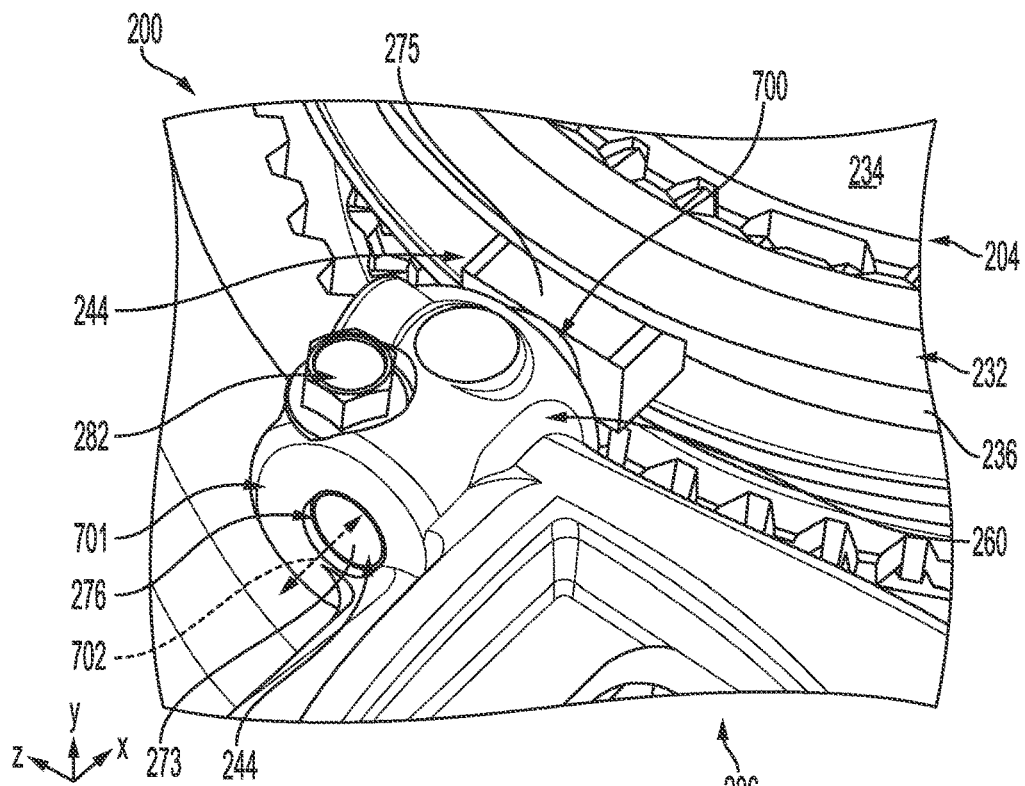
FIGS. 7 and 8 show an attachment device and the fork guide in the shift fork system.
Figure 8:
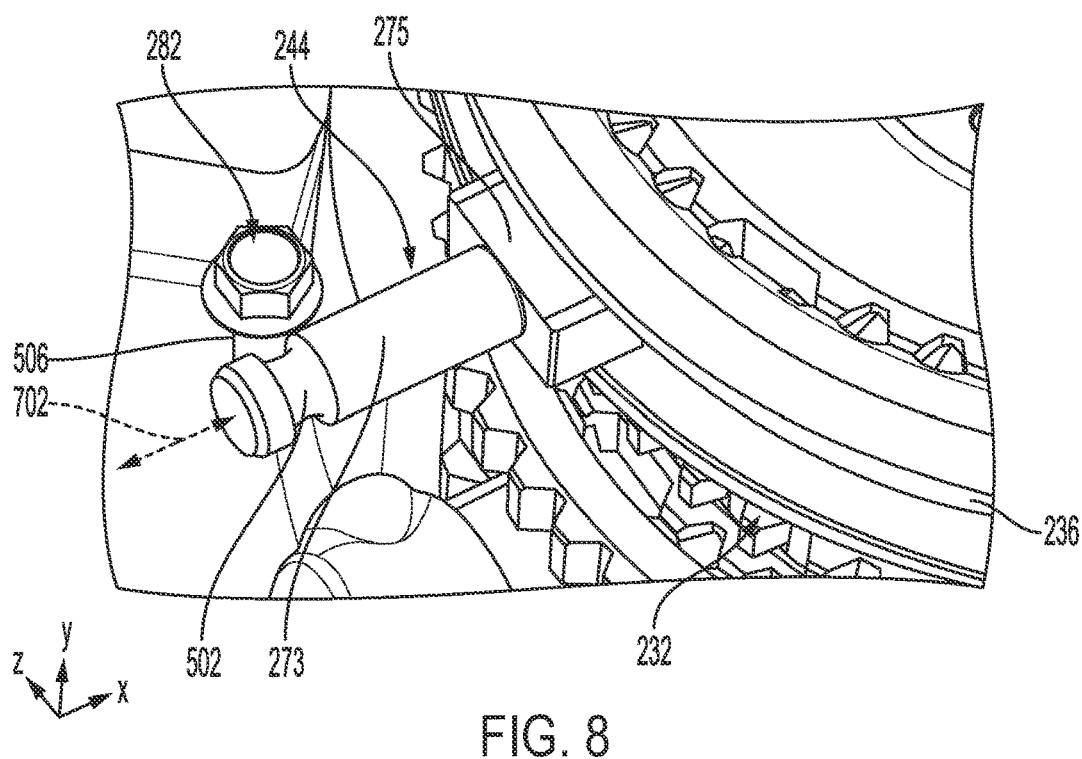
Figure 9:
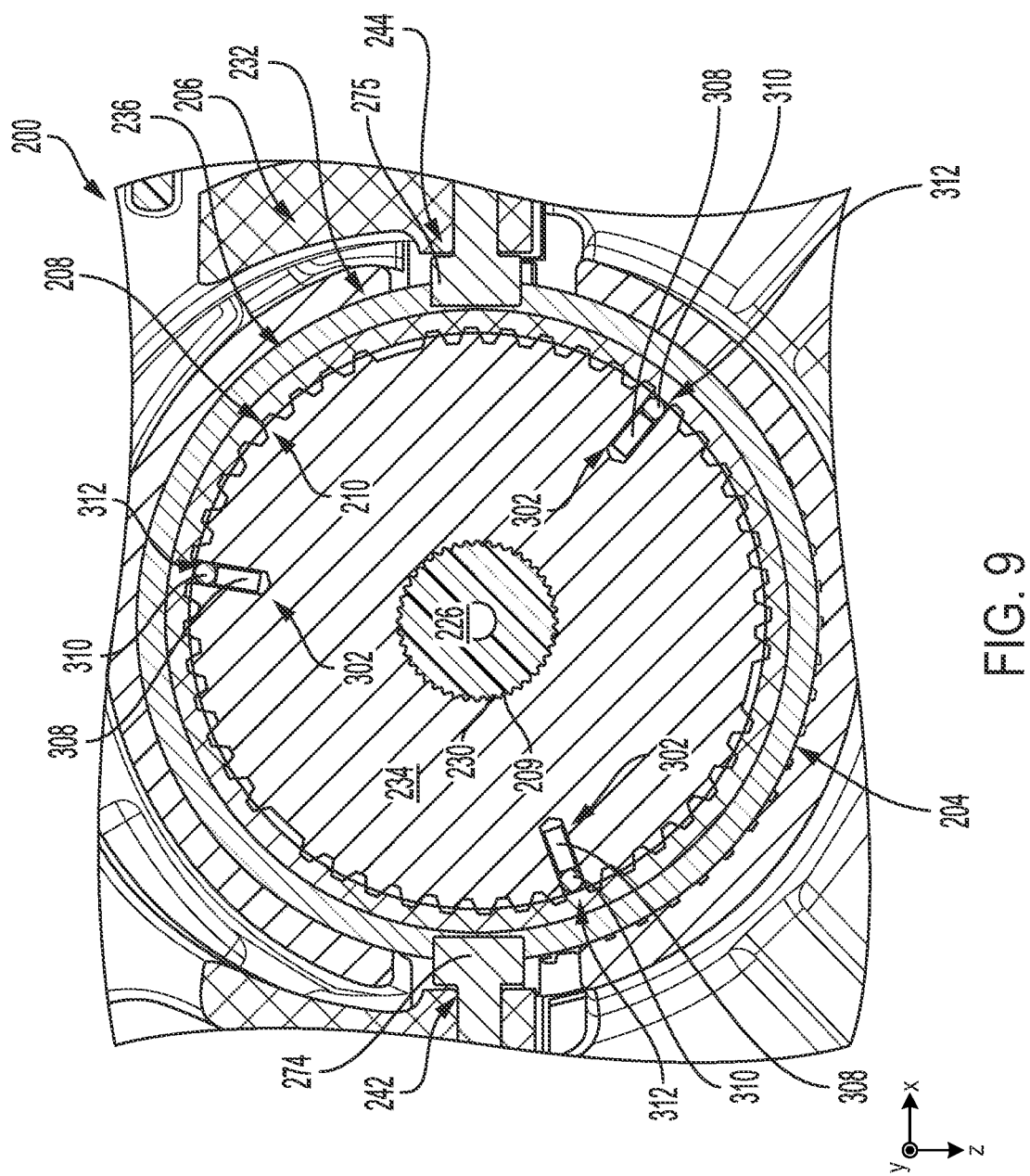
FIG. 9 shows a cross sectional view of the clutch assembly, depicted in FIG. 6.
Figure 10:
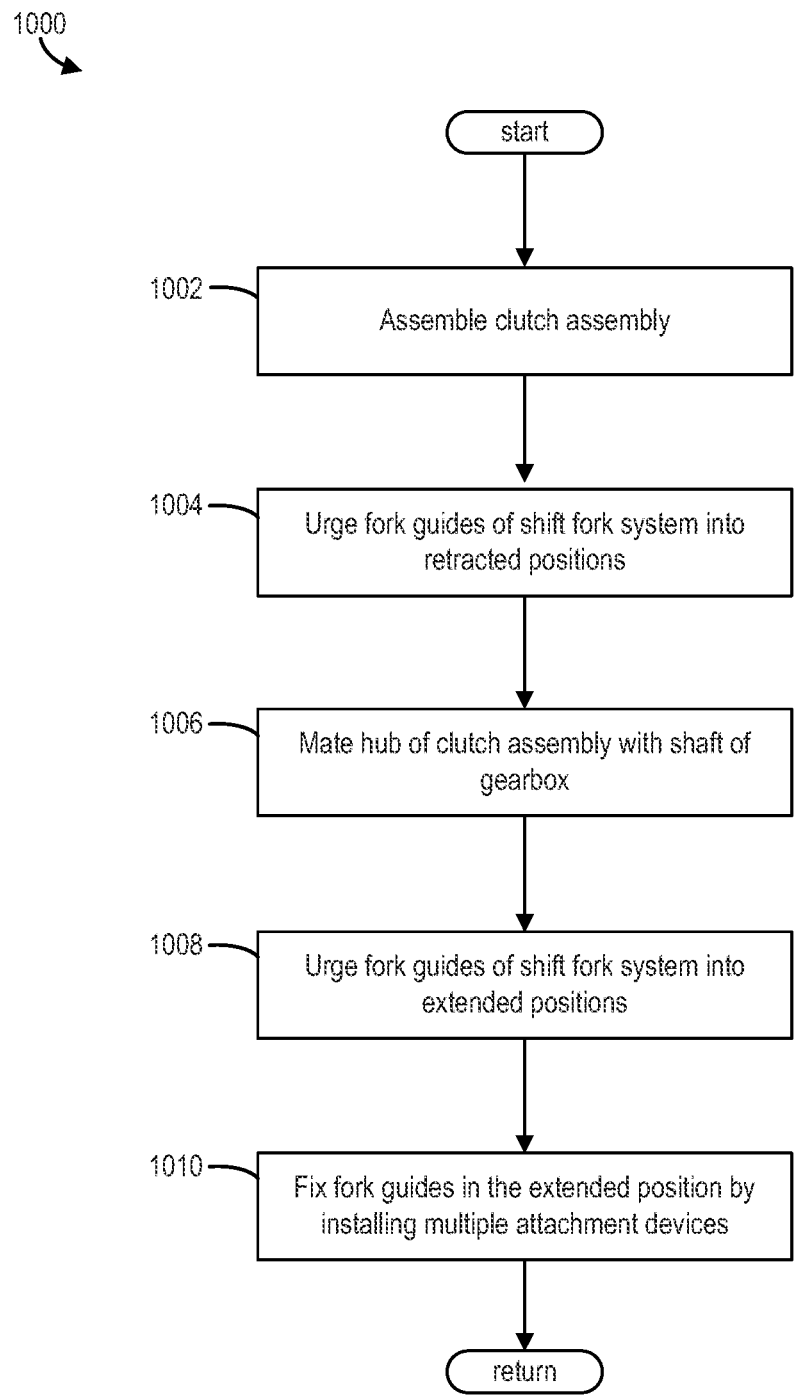
FIG. 10 is a flowchart illustrating a method for installing a clutch assembly into a transmission.
Figure 11:
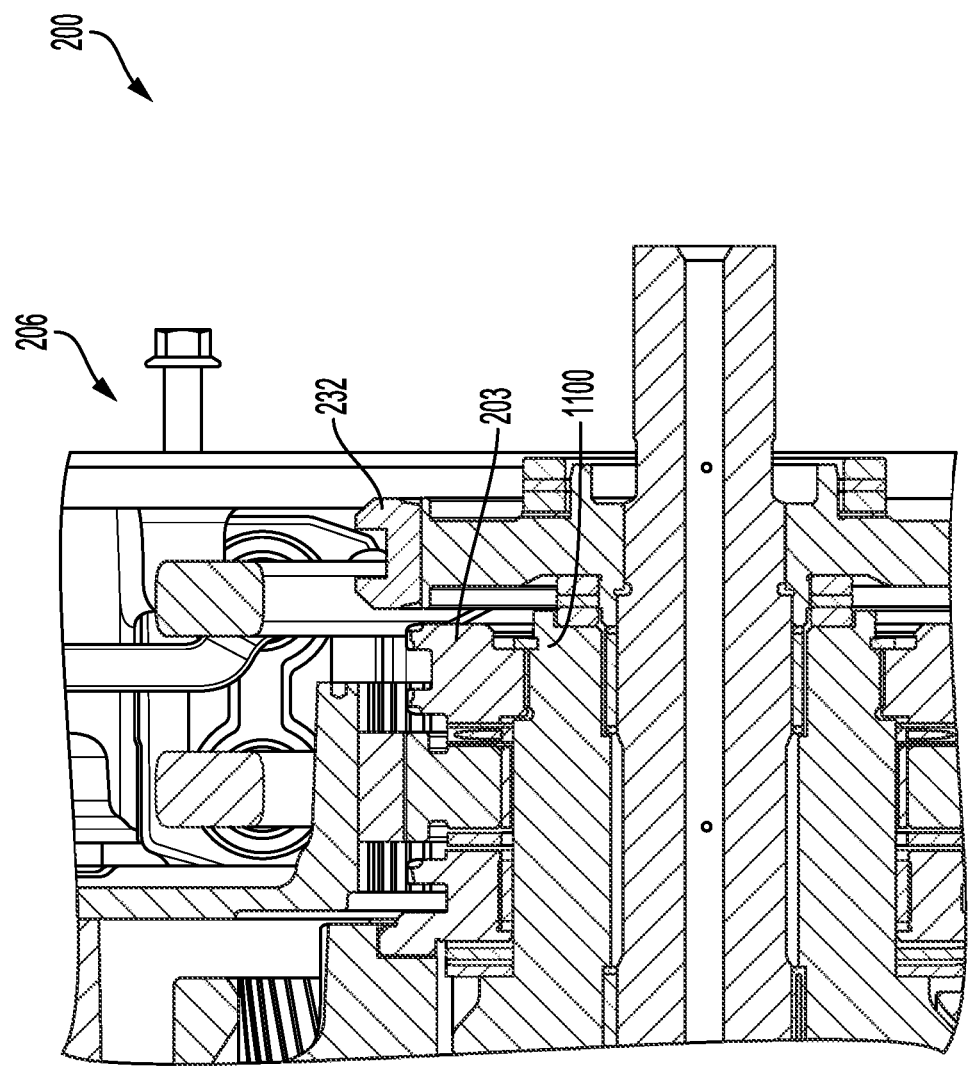
FIG. 11 shows a cross-sectional view of the shift fork system, depicted in FIG. 6.
Figure 12:
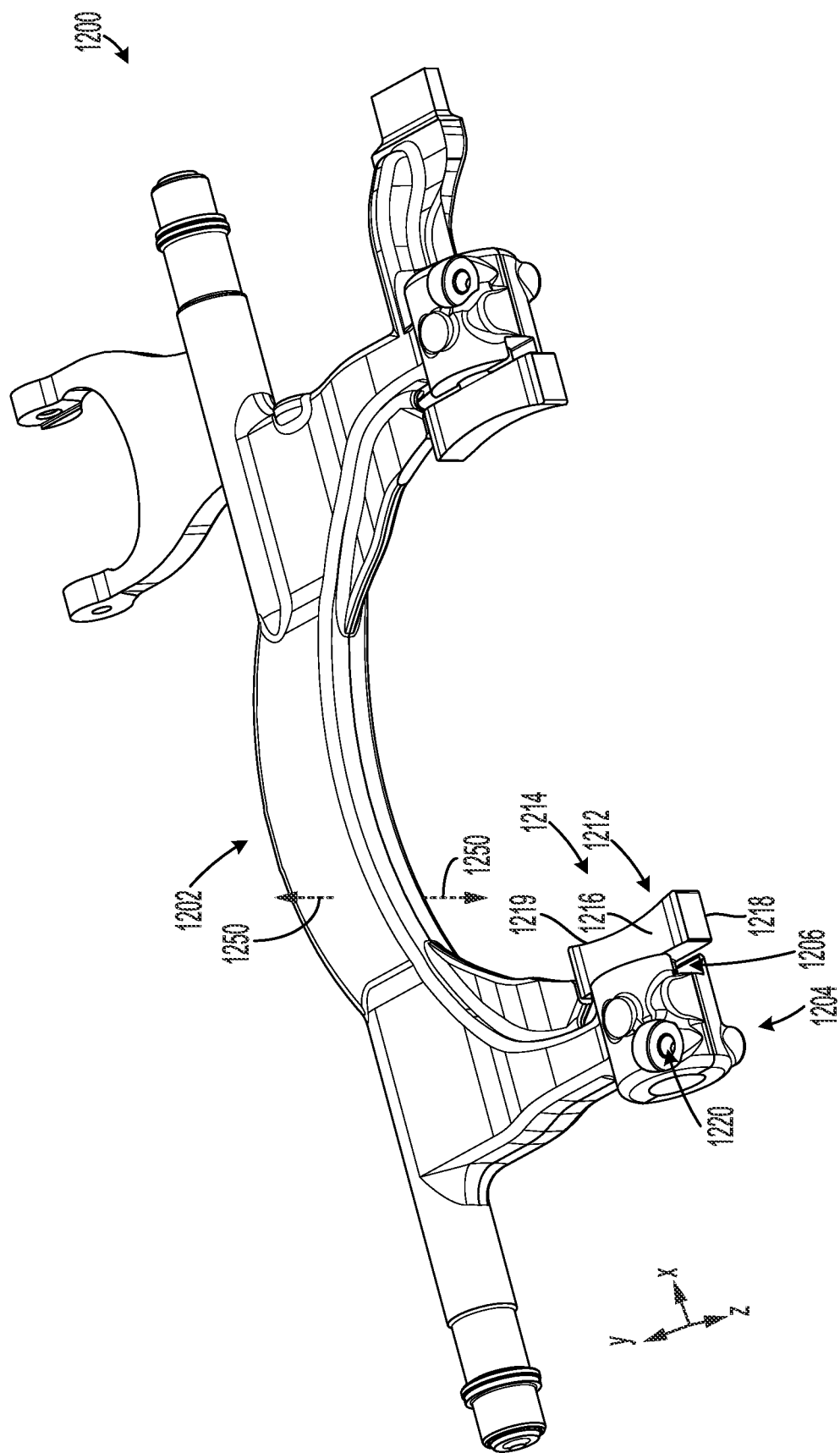
FIGS. 12-13 show another example of a shift fork system.
Figure 13:
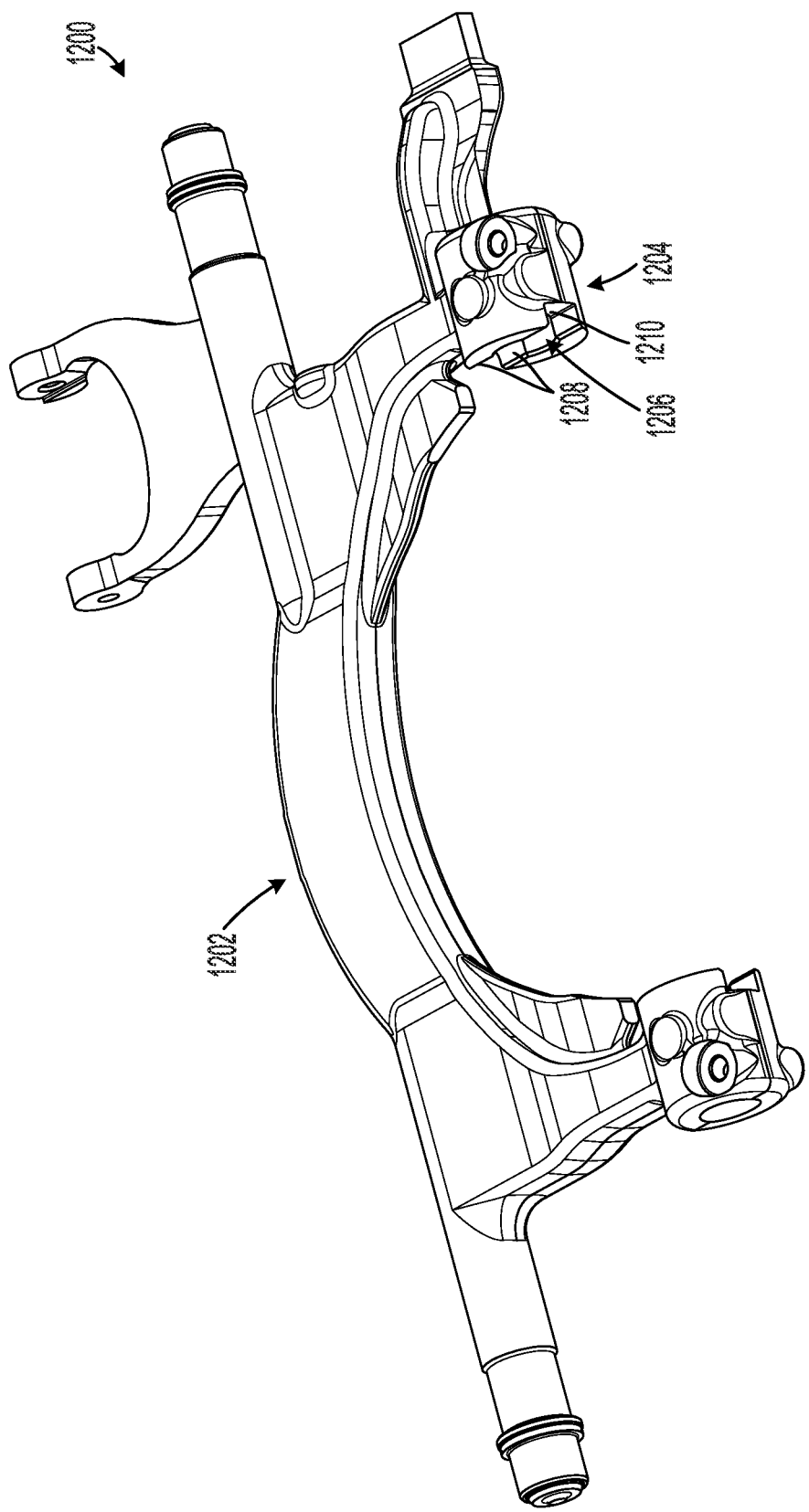

The following description relates to systems for a vehicle, as shown in FIG. 1. The vehicle may include a transmission with a housing, a shift fork system, and a clutch assembly as shown in FIG. 2. The clutch assembly may include a hub and a sliding sleeve, which may be cooperatively installed onto a shaft of the transmission. FIG. 3 shows multiple fork guides of the shift fork system in retracted positions to increase clearance within the shift fork system for the clutch assembly to mate with the shaft. In the absence of an attachment device, guide forks may be shifted from an assembly position, as shown in FIG. 4, to an operating position, as shown in FIG. 5. FIG. 6 shows the clutch assembly positioned within the fork guides of the shift fork system. While in the operating position, the fork guides may mate with an outer recess of the sliding sleeve. FIGS. 7 and 8 show how the fork guides may be held in the operating position by an attachment device. The fork guides retract into the assembly position to increase the clearance between the shaft and the shift fork system, allowing the hub and sliding sleeve to be cooperatively installed into the transmission. Installing the hub and sliding sleeve as one unit decreases the chance of losing components from multiple neutral detents in the housing of the transmission. The detents of the clutch assembly are shown in FIG. 9. Once the hub and sliding sleeve are installed, with the hub mated to a shaft of the transmission, the fork guides can be shifted back into the operating position and fixed in place by attachment devices. A method for installing the clutch assembly into the shift fork system of the transmission is illustrated in FIG. 10. FIG. 11 shows a cross-sectional view of the shift fork system. FIGS. 12-13 show another example of a shift fork system.

FIGS. 1-9 and 11-13 include a coordinate system to orient the views. The y-axis may be a vertical axis (e.g., parallel to a gravitational axis), the x-axis may be a longitudinal axis, (e.g., horizontal axis), and/or the z-axis may be a lateral axis, in one example. However, the axes may have other orientations, in other examples.

FIG. 1 shows a schematic depiction of a vehicle 6 with a powertrain 8 that may include a prime mover 54 and a transmission 60. In some examples, the prime mover 54 may be an electric motor (e.g., a traction motor). In such an example, the electric motor may be electrically connected to an energy storage device 58 (e.g., one or more traction batteries, capacitors, fuel cells, combinations thereof, and the like). Further, in the electric motor example, the motor may be configured to operate as a generator, during selected conditions, to provide electrical power to charge the energy storage device 58, for example. In other examples, the prime mover 54 may be an internal combustion engine. Therefore, the vehicle 6 may be a hybrid vehicle, an all-electric vehicle, or an internal combustion engine vehicle.

In the illustrated example, the transmission 60 delivers mechanical power to a differential 62 of an axle assembly 53. However, it will be appreciated that the transmission 60 may additionally or alternatively deliver mechanical power to the other axle 64 in the vehicle 6. Still further, in other examples, the transmission may be incorporated into one of the axles to form an electric axle assembly. In the electric axle example, an internal combustion engine may provide mechanical power to the other axle, in some cases.

The transmission 60 (e.g., a gearbox) may be configured to receive torque from the prime mover 54 via a shaft (e.g., a drive shaft) and/or other suitable mechanical component. The transmission 60 may include at least one clutch 61. The clutch may be a disconnect clutch or a clutch for shifting between gears. The clutch 61 in the transmission 60 may be operated via a shift fork system 63 which is actuated via an actuator 65 (e.g., a hydraulic, pneumatic, and/or electro-mechanical actuator).

Further, the transmission 60 may output torque to the differential 62. The output torque may be moderated based on selective adjustments to gear engagement in the transmission 60 to accommodate desired vehicle operation. Torque from the transmission 60 may drive rotation of the differential 62, which may in turn drive rotation of axle shafts 66 which are rotationally coupled to drive wheels 55.

A controller 112 may form a portion of a control system 114. The control system 114 is shown receiving information from sensors 116 and sending control signals to actuators 181. As one example, the sensors 116 may include sensors such as an energy storage device sensor, a clutch activation sensor, etc. As another example, the actuators 181 may include a shift fork actuator, etc. The shift fork actuator may be configured to move a clutch (e.g., a dog clutch or a synchronizer) into and out of engagement with one or more gears of the transmission 60. The controller 112 may receive input data from the sensors, process the input data via a processor, and trigger the actuators in response to the processed input data based on instruction or code programmed therein corresponding to one or more routines. In some examples, the controller 112 may include instructions that send a command signal to the actuator 65 of the shift fork system 63 to engage or disengage the clutch 61. Clutch engagement or disengagement may alter the transmission gear ratio or permit or inhibit mechanical power transfer from the prime mover 54 to the drive wheels.

FIG. 2 shows a transmission 200 (e.g., a gearbox) with a housing 202, where a portion of the housing 202 has been removed to reveal components positioned within the transmission 200. The transmission 200 further includes a clutch assembly 204 and a shift fork system 206. When assembled, the clutch assembly 204 and the shift fork system 206 may be positioned within the housing 202. The transmission 200 is an example of the transmission 60 shown in FIG. 1. Therefore, the transmission 60 may include at least some structural and functional features from the transmission 200 and vice versa.

The clutch assembly 204 is specifically illustrated as a dog clutch assembly, which is configured to adjust shaft speed and allow for engagement of toothed interfaces in the clutch. Alternatively, the clutch assembly may be a synchronizer assembly, which is designed to reduce the differential speed between the shaft and the gear during clutch engagement and may include a blocker ring or friction cone. In either case, the clutch assembly includes toothed interfaces that mate with a driven component.

The housing 202 may include a section 212. The inner volume 214 of the section 212 may house at least a portion of the clutch assembly 204 and the shift fork system 206. The section 212 may include a lip 216 that may include openings 222 which allow other sections of the housing to be coupled thereto. However, the housing may have a variety of suitable contours, sectional arrangements, and the like.

In the illustrated example, the transmission 200 includes a shaft 226. The clutch assembly 204 is configured to removably attached to the shaft 226. To elaborate, the hub 234 may be splined and/or otherwise removably coupled to the shaft 226. As such, a rotational axis 224 of the shaft 226 may be oriented coaxial to a rotational axis of the clutch assembly 204. It will be understood that the shaft 226 may be rotationally driven by upstream components such as a motive power source (e.g., a traction motor and/or an internal combustion engine). The shaft 226, as illustrated includes, a splined section 228 and a splined section 230. The splined section 228 may be configured to mate with motor shaft or other suitable mechanical component such as a gear in the transmission. Additionally, the splined section 230 is profiled to mate with the clutch assembly 204. As such, the clutch assembly 204 may rotate in unison with the shaft 226. Further, in one example, bearings 227 may be coupled to a hub 234.

The clutch assembly 204 includes the hub 234. The hub 234 includes inner splines 209 that are profiled to mate with the splined section 230 of the shaft 226. Further, in the illustrated example, the clutch assembly additionally includes a sliding sleeve 232. However, other clutch assembly configurations have been contemplated.

The sliding sleeve 232 and the hub 234 may each have an annular shape. The hub 234 may be positioned within the sliding sleeve 232, as shown in FIG. 2. The hub 234 may include outer splines 208 positioned on an outer circumferential surface of the hub 234. The outer splines 208 mate with splines 210 of the sliding sleeve 232 such that the sliding sleeve 232 and the hub 234 may rotate in unison and allow the sliding sleeve to axially translate in relation to the hub during clutch engagement and disengagement. The sliding sleeve 232 may slide along the hub 234, relative to the y-axis, when the clutch transitions between engaged and disengaged configurations. As such, the sliding sleeve 232 may be installed onto the hub 234 by sliding the sliding sleeve onto the hub.

The hub 234 may include an extension 225 that radially extends from a hub body 223 of the hub. However, the hub may be contoured without the extension, in other examples.

The sliding sleeve 232 may include an outer recess 236 that may circumferentially extend around the sleeve. The outer recess 236 may be positioned between a lip 240 and a lip 241 of the sliding sleeve 232. However, in other examples, the recess may include multiple discrete sections that may be sized to receive the heads of the fork guides 242, 244, discussed in greater detail herein.

The transmission 200 may include a gear 1100, shown in FIG. 11. Further, the gear may specifically be oriented coaxial to the shaft 226 shown in FIG. 2. Additionally, the gear may be coupled to the shaft via a bearing (e.g., a needle bearing). Continuing with FIG. 2, the clutch assembly 204 may be configured to selectively transfer torque from the shaft to the gear when engaged. Conversely, when the clutch assembly 204 is disengaged, the shaft and the gear may independently rotate.

FIG. 11 shows a cross-sectional view of the transmission 200 with the shift fork system 206. The gear 1100 is depicted in FIG. 11 along with the collar 203 and the clutch sliding sleeve 232.

Continuing with FIG. 2, the transmission 200 may include a collar 203 in the clutch assembly 204. The collar 203 may be coupled to the gear 1100, shown in FIG. 11, via splines or other suitable attachment technique. Additionally, the transmission 200 may include a blocker ring that act to match the rotational speeds of the clutch assembly 204 and the gear 1100, shown in FIG. 11, through the use of friction, until the rotational speeds match and the sliding sleeve 232 may mesh with the gear. In either construction, once the sliding sleeve 232 is meshed with the gear, rotational power may be transferred to the shaft 226 from the gear via the clutch assembly 204, as shown in FIG. 2.

The transmission 200, depicted in FIG. 2, includes the shift fork system 206. The shift fork system 206 includes a shift fork 207. The shift fork 207 functions as a mechanical linkage between an actuator 211 and the clutch assembly 204. The actuator may be hydraulically, pneumatically, and/or electro-mechanically operated. To elaborate, during clutch engagement and disengagement the actuator moves the shift fork in directions 245 and 247 that are parallel to the rotational axis 224 of the shaft 226 to engage and disengage the clutch assembly.

The shift fork 207 may be formed as a monolithic structure (e.g., a single piece construction). Designing the shift fork with a single piece construction, enables the strength of the shift fork to be increased and the play within the mechanical linkage that connects the clutch actuator 211 to the clutch assembly 204 to be reduced. As a result, the durability of the shift fork assembly is increased and the clutch may be more effectively engaged and disengaged.

The shift fork 207 includes a body 250 that may be conceptually divided into different sections. In one example, the body 250 may include an arch 264 and arms 258 that extend therefrom. Fork guide interfaces 260 may be positioned at or near the distal ends of the arms 258. To elaborate, the fork guide interfaces may be positioned approximately 180 degrees apart (e.g., precisely 180 degrees apart) with regard to the axis 224, in one specific example, to avoid uneven loading on the clutch assembly during actuation. The shift fork body 250 may further include a cross-shaft 259 (e.g., tubular shaft). However, other shift fork body profiles have been contemplated such as shift fork bodies without cross-shafts and/or with the fork guide interfaces in alternate positions or with additional fork guide interfaces. However, it will be understood that using two fork guide interfaces which are positioned on opposing sides of the clutch assembly (when installed) enables the clutch assembly to be more efficiently installed.

In one specific example, the shift fork body 250 may be U-shaped and/or C-shaped. Further, the shift fork body 250 is positioned radially outward from the clutch assembly 204, when the clutch assembly is coupled to the shaft 226. In this way, the shift fork is capable of adjusting the clutch assembly for engagement and disengagement.

The fork guide interfaces 260 may include recessed areas 285, respectively. Further, arms 258 may include holes 602 that are positioned within the recessed areas 285. The holes 602 are profiled to receive attachment devices 282 which are discussed in greater detail herein. For instance, the holes may have threads profiled to engage threads on the attachment devices 282. However, the arms may have other contours, in alternate examples. For instance, the recessed areas and/or holes may be omitted from the fork guide interfaces, in other examples.

The shift fork system 206 further includes fork guides 242 and 244 with a stems 272, 273 and heads 274, 275. The fork guides 242, 244 may be adjustably coupled to the shift fork body 250 via openings 276 in the arms 258. To expound, the stems 272, 273 mate with openings 276 and therefore can translate the fork guides 242, 244 into and out of the extended position and the retracted position. Further, it will be understood that the fork guides are in their retracted positions in FIG. 2.

The stems 272, 273 are cylindrical in the illustrated example. However, in alternate examples, the stems may have polygonal cross-sections (with regard to cut-planes that are perpendicular to their central axes) or may have one or more planar sides and one or more curved sides, for instance. The cross-sections of the openings 276 may have a similar cross-sectional contour to the stems to allow for smooth axial translation of the stems in the openings while supporting the stems.

The openings 276 may extend through the arms 258 from an inner side to and outer side in a radial direction. However, other openings orientations are possible. The heads 274, 275 of the fork guides 242, 244 may each be positioned at one longitudinal end of the corresponding stem. When in retracted positions (e.g., assembly positions), as illustrated in FIG. 2, there is clearance between the heads 274, 275 for installation of the clutch assembly 204. In this way, the installation process may be simplified. To elaborate, designing the fork guides to be adjustable to create clearance during clutch assembly installation allows the shift fork system to use a one-piece shift fork, if so desired.

In one specific example, the fork guides 242, 244 may be radially oriented with regard to the axis 224 by a separation of 180 degrees to achieve balanced loading on the clutch via the fork guides 242. As such, the fork guides 242, 244 may be positioned across from each other in relation to the x-axis. In other examples, the fork guides 242, 244 may be positioned in alternate suitable locations. For instance, the fork guides may have a separation of less or greater than 180°. Further still in other examples, additional fork guides may be included in the shift fork system to decrease localized loading on the clutch assembly.

FIGS. 2-6 show an installation process of the clutch assembly 204 in the shift fork system 206 and the transmission 200 that includes multiple sequential steps which allow the clutch assembly to be quickly and efficiently installed in the shift fork system of the transmission. Further, the installation sequence and specifically, the slidable functionality of the fork guides allow the system to exhibit greater clearance temporarily during clutch installation and then be placed back into and fixed in their actuation positions that enables clutch engagement and disengagement.

FIG. 3 shows the clutch assembly 204 mated with the shaft 226. In this way, the clutch assembly 204 may be effectively installed in the transmission 200. The clutch assembly 204 may be installed as one unit, subsequent to the assembly of the sliding sleeve 232 with the hub 234. Installation of the clutch assembly as a single unit decreases the chance of clutch parts becoming lost or misplaced as is discussed in greater detail herein. However, in alternate examples, some of the clutch assembly components may be sequentially installed which may however decrease installation efficiency.

In the illustrated example, the fork guides 242, 244 are in retracted positions. The retracted positions may be referred to as assembly positions. With the fork guides 242, 244 in the retracted position, there is enough clearance between the shaft 226 and the shift fork system 206 for the sliding sleeve 232 to remain coupled to the hub 234 as the clutch assembly 204 is installed. The clutch assembly 204 may be mated with the shaft 226 which rotates about axis 224. The inner splines 209 of the hub 234 may mate with the splined section 230 of the shaft 226. As such, the hub 234 may be coupled to the shaft 226, and hub and the shaft may rotate in unison when installed. Further, the sliding sleeve 232 is capable of axial translation along the hub 234 while the hub mates with the shaft 226 to facilitate clutch engagement and disengagement.

FIG. 4 shows a detailed view of the fork guide 242 of the shift fork system 206 in the assembly position (e.g., the retracted position). As such, a clearance 400 is formed between the fork guide 242 and the clutch assembly 204 to enable efficient installation of the clutch assembly as a single unit, if so desired.

Additionally, the hole 602 in the shift fork arm 258 is again illustrated. In one example, the hole 602 may extend through the arm 258 along an axis that is parallel to the y-axis, perpendicular to the longitudinal axis of the stem 272 of the fork guide 242. However, other orientations of the holes are possible. As discussed in greater detail herein with regard to FIG. 6, the hole 602 may receive an attachment device which fixes the position of the fork guide.

In the assembly position, as shown in FIG. 4, the fork guide 242 is in a retracted location in relation to the clutch assembly 204. The fork guide 242 may therefore be shifted along an axis 702 to transition the fork guide into the retracted and extended positions. The axis may be radially aligned with regard to the rotational axis 224 of the shaft 226, shown in FIG. 2. Radially aligning the fork guides allows the guides to load the clutch assembly in a more balanced manner during clutch engagement and disengagement. However, the fork guides may be transitioned into and out of the retracted and extended positions using other suitable mechanisms, in alternate designs. For instance, the fork guides may pivot about an axis on their stems to enable the guides to transition between the retracted and extended positions. As previously indicated, the retracted position may be referred to as an assembly position and the extended position may be referred to as an operating position.

An end 402 and the groove 502 of the stem 272 may extend past an outer side of the fork guide interface 260 when the guide is in the retracted position. Conversely, when the fork guide 242 is in the operating position, as illustrated in FIG. 5, the groove 502 may be positioned inside of the fork guide interface 260, aligned with the hole 602 along the y-axis. However, in alternate examples, the stem may be enclosed in the fork guide interface in both the extended and retracted positions.

Returning to FIG. 4, with the head 274 of the fork guide 242 spaced away from the sliding sleeve 232, the clearance therebetween is increased. The ability to slide the fork guide 242 from the operating position to the assembly position allows for the clutch assembly 204 to more easily and quickly be installed into the transmission 200.

FIG. 5 shows the fork guide 242 of the shift fork system 206 in the operating position. The fork guide 242 is shifted into the operating position after the clutch assembly 204 is installed in the transmission 200. As illustrated in the FIG. 5 example, in the operating position, the groove in the stem 272 of the fork guide 242 is positioned within the fork guide interface 260. However, other shift form system architectures are possible.

The fork guide 242 extends inward (e.g., radially inward) from the fork guide interface 260 so that the head 274 of the fork guide 242 is mated with the outer recess 236 of the sliding sleeve 232. As such, the fork guide 242 may be used to shift (e.g., axially translate) the sliding sleeve 232 along the hub 234, relative to the y-axis, into an engaged and/or disengaged position. In this way, the clutch assembly 204 may couple and/or decouple from one or more driven gears of the transmission 200. Once the fork guide is oriented in the operating position, the fork guide is fixed in place by an attachment device as described in greater detail herein with reference to FIG. 6.

FIG. 6 shows the transmission 200 with the fork guides 242, 244 in their operating positions. The fork guides 242, 244 extend inwards toward the clutch assembly 204. The head 274 of the fork guide 242 mates with the outer recess 236 of the sliding sleeve 232 when the fork guide is in the extended position. Similarly, the head 275 of the fork guide 244 mates with the outer recess 236 of the sliding sleeve 232 when the fork guide is in the extended position.

After the clutch assembly 204 is installed and the fork guide 242 is placed in the extended position (e.g., the operating position), the fork guides 242, 244 can be retained in the extended position by attachment devices 282 which are inserted (e.g., threaded, press-fit, and the like) into holes 602 as illustrated in FIG. 6. However, the fork guides may be fixed into position using alternate suitable techniques, in alternate examples. For instance, clamps, pins, combinations thereof, and the like may be used to fix the position of the fork guides.

The attachment devices 282 may each include a head 283 and a shank 506, shown in FIG. 8. In FIG. 6 the shank is hidden from view due to it being mated with the corresponding hole in the fork guide interface 260.

The head 283 of the attachment device 282 may be positioned in the recessed area 285 of the fork guide interface 260. In this way, the compactness of the shift fork system is increased. However, the recessed area may be omitted from the fork guide interface, in alternate examples. When the attachment devices 282 is positioned in the hole of the fork guide interface 260, the attachment devices 282 fix the fork guides 242, 244 in their extended positions. Conversely, the attachment devices 282 are designed to be removed from the fork guide interface 260 to allow the fork guide 242 to be shifted back into the retracted position (e.g., the assembly position). Using the attachment devices in the shift fork system allow the fork guides to be confidently held in their desired position with a diminished chance of the guides moving into an unwanted position.

It will be appreciated that the fork guide 242 is capable of being shifted back into the retracted position to increase clearance within the shift fork system 206 for the clutch assembly 204 to be installed and/or removed from the transmission 200.

In some examples, the attachment devices 282 may be shoulder bolts. Shoulder bolts may be used due to their stable design. However, the attachment devices may take other forms in alternate examples such as screws, pins, combinations thereof, or other suitable fasteners. As such, the attachment devices may include threads the are profiled to threadingly engage the holes 602. Cutting plane A-A' indicates the cross-sectional view depicted in FIG. 9 and cutting plane B-B' indicates the cross-sectional view depicted in FIG. 11.

FIG. 7 shows the fork guide 244 arranged in the operating position within the fork guide interface 260. FIG. 7 specifically shows one of the attachment devices 282 positioned within the fork guide interface 260 of the shift fork system 206 to fix the position of the fork guide 244. The stem 273 of the fork guide 244 is at least partially positioned within the opening 276. The opening 276 may extend from an inner side 700 of the fork guide interface 260 to an outer side 701 of the interface.

FIG. 8 shows one of the attachment devices 282 and the fork guide 244 in the operating position. In FIG. 8, the fork guide interface is removed from view to reveal the interaction between the attachment device 282 and the stem 273 of the fork guide 244. As illustrated, the shank 506 of the attachment device 282 is positioned partially within the groove 502 in the stem 273 of the fork guide 244. The groove 502 may be a circumferential groove that extends around the circumference of the stem 273. In other examples, the groove 502 may extend around a portion of the stem's circumference. To elaborate, the attachment device 282 mates with the groove 502 to delimit movement of the fork guide 244. As such, the attachment device 282 prevents the fork guide 244 from sliding along the axis 702 by catching on the groove 502. In this way, the attachment device 282 holds the fork guide 244 in the extended position, such that the head 275 of the fork guide 244 may remain mated with the outer recess 236 of the sliding sleeve 232. Conversely, to allow movement of the fork guide the shank 506 of the attachment device 282 may be removed from the groove 502 of the fork guide 244.

FIG. 9 shows a cross sectional view of the shift fork system 206 and the clutch assembly 204, including the hub 234 and the sliding sleeve 232. The hub 234 is shown positioned circumferentially around the shaft 226. The inner splines 209 of the hub 234 may mesh with the splined section 230 of the shaft 226. Further, the outer splines 208 of the hub 234 mesh with the splines 210 of the sliding sleeve 232, in the illustrated example. As such, the sliding sleeve 232 may couple to the hub 234 and the hub 234 may couple to the shaft 226 in such a way that each of the hub 234, the sliding sleeve 232, and the shaft 226 may rotate in unison. However, other shaft and clutch assembly designs may be used in other examples.

The heads 274, 275 of the fork guides 242, 244 are shown positioned within the outer recess 236 of the sliding sleeve 232, in FIG. 9. In some examples, each of the heads 274, 275 may be a polyhedron. However, in other examples, the heads may include curved surfaces. To elaborate, in other examples, each of the heads 274, 275 may be crescent shaped. As such, at least a portion of the curved surface of each head may be adjacent to a circumferential surface of the outer recess 236. In still other examples, each of the heads 274, 275 may be another suitable shape that can fit within the outer recess 236 (e.g., between the lip 240 and the lip 241).

The clutch assembly 204 includes neutral detents 302, in the illustrated example. The neutral detents function to reduce play between the hub 234 and the sliding sleeve 232. However, in alternate examples, the neutral detents may be omitted from the clutch assembly 204. The neutral detents 302 are positioned in slots 312 in the hub 234. The slots 312 extend (e.g., radially extend) into the hub 234 from an outer circumferential surface of the hub 234. Further, a portion of the slots 312 may be positioned between splines 208 of the hub 234. The neutral detents 302 include springs 308 and balls 310, in the illustrated example. However, other detent configurations are possible.

The springs 308 may be under compression (e.g., spring loaded) when the hub 234 in positioned within the sliding sleeve 232 to form the clutch assembly 204, as illustrated in FIG. 9. In such an example, if the sliding sleeve 232 was removed from the hub 234, the springs 308 would decompress and potentially eject the springs and balls from the slots 312. Ejection of the neutral detents 302 increases the chance of one or more components being lost within the transmission 200 which may result in component degradation and inoperability, in certain instances. As such, it may be desirable to install the detents and assemble the sliding sleeve on the hub prior to installation of the clutch assembly on the shaft (e.g., at a location external to the transmission), to reduce the chance of losing the detent components in the transmission.

FIGS. 12-13 show another example of a shift fork system 1200. The shift fork system 1200 again includes a shift fork 1202 which may have a one-piece construction. The shift fork 1202 includes fork guide interfaces 1204 with a different shape than the other shift fork systems described herein. To elaborate, the fork guide interfaces 1204 include notches 1206 with opposing walls 1208 and rear wall 1210 that profiled to mate with heads 1212 of fork guides 1214. Opposing faces 1216, 1218 of the heads 1212 may specifically be positioned adjacent to the opposing walls 1208. Specifically, at least one of the walls and the head faces may be in face sharing contact during transmission operation. Therefore, during clutch engagement, loads may be transferred from the fork guide heads to the shift fork which may have greater structural integrity and is less susceptible to undesirable deformation due to loading during actuation. Specifically, as the shift fork is translated along axis 1250 during clutch engagement and disengagement, the notches allow the fork guide interfaces in the shift fork to receive loads from the fork guides and reduce the likelihood of the fork guides bending. Consequently, shift fork system longevity is increased, thereby increasing customer appeal. The heads 1212 may further include a curved surface 1219 to allow the fork guides to effectively mate with the sliding sleeve in the clutch. Additionally, the fork guide interfaces 1204 may include holes 1220 which allow attachment devices to be mated therewith and fix the position of the fork guides.

FIG. 10 shows a method 1000 for installing a clutch assembly in a shift fork system. The method 1000 may be used to install any of the clutch assemblies in the shift fork systems described above or a combinations of the clutch assemblies and/or shift fork systems, in one example. However, in other examples, the method 1000 may be used to install other suitable clutch assemblies in other suitable shift fork systems. It will be appreciated that at least a portion of the method steps may be implemented by manufacturing personnel. Additionally or alternatively, at least a portion of the method steps may be implemented by machines that may be at least partially automated and include a controller that can store the steps as instructions and execute the instructions as control commands.

At 1002, the method 1000 includes assembling a clutch assembly. Forming the clutch assembly may include positioning a hub within a sliding sleeve. To elaborate, the sliding sleeve may slide over the hub such that the hub and the sliding sleeve are removably coupled. Further, when forming the clutch assembly, splines positioned on an inner circumferential surface of the sliding sleeve may mesh (e.g., mate) with splines on an outer circumferential surface of the hub. As such, the hub and the sliding sleeve are removably coupled together during clutch assembly formation and configured to rotate in unison during transmission operation. Additionally, the neutral detents (e.g., the springs and balls) may be installed in the hub prior to and/or while the sliding sleeve is coupled to the hub.

At 1004, the method 1000 includes urging fork guides of the shift fork system into their retracted positions. Prior to fork guide retraction, the attachment devices may be removed from the holes in the fork guide interfaces to enable fork guide translation. The fork guides are retracted away from their operating position to increase the clearance within the shift fork system and make room for clutch assembly installation. To elaborate, the fork guides may be retracted in radial directions away from the rotational axis of the shaft. The increased clearance between the shaft and the fork guides allows for the clutch assembly to be installed all at once, if desired. As such, there is a reduced chance that neutral detents positioned in the hub will eject out of the clutch assembly and into the gearbox.

At 1006, the method 1000 includes mating the hub of the clutch assembly with a shaft of a gearbox. In this way, the clutch assembly can be efficiently installed as a single unit with a decreased chance of losing component such as the springs and balls of the neutral detents.

At 1008, the method 1000 includes urging the fork guides into their extended positions. To expound, multiple (e.g., two) fork guides may be urged inward toward the clutch assembly. The fork guides may be moved inward until a head of each fork guide is mated with the recess in the sliding sleeve. By positioning the fork guides in the outer recess of the sliding sleeve, the fork guides are able to move the sliding sleeve relative to the hub. In this way, the fork guides are able to change the axial position of the sliding sleeve to engage and disengage the clutch.

At 1010, the method 1000 includes fixing the fork guides in the extended position by installing attachment devices in the fork guide interfaces. Each attachment device may include a head and a shank. The shank may be threaded into or press fit with the holes in the fork guide interfaces. Further, as previously discussed the shanks may each mate with a recess in the corresponding fork guide stem to inhibit axial translation of the stem.

The technical effect of the installation methods described herein is to allow a clutch assembly to be more efficiently installed in a shift fork system which is able to use a single piece shift fork construction and decrease the likelihood of losing detent components during clutch assembly installation.

The disclosure also provides support for a shift fork system which comprises a plurality of fork guides adjustably coupled to a shift fork body, a plurality of attachment devices which are each configured to releasably fix a position of one of the plurality of fork guides in relation to a clutch assembly, wherein each fork guide, in a first position, is configured to mate with and adjust the clutch assembly, and wherein the clutch assembly includes a hub. In a first example of the shift fork system, heads of the plurality of fork guides mate with an outer recess in the clutch assembly. In a second example of the shift fork system, optionally including the first example, the plurality of attachment devices are shoulder bolts that mate with grooves in stems of the plurality of fork guides when they are in a configuration that fixes a position of the plurality of fork guides in relation to the clutch assembly. In a third example of the shift fork system, optionally including one or both of the first and second examples, the shift fork body forms a monolithic structure. In a fourth example of the shift fork system, optionally including one or more or each of the first through third examples, the plurality of fork guides are designed to radially extend and retract in relation to the shift fork body. In a fifth example of the shift fork system, optionally including one or more or each of the first through fourth examples, when the plurality of fork guides are mated with a recess in the clutch assembly, the plurality of fork guides are in the first position which is an extended position, and when the plurality of fork guides are decoupled from the recess of the clutch assembly, the plurality of fork guides are in a retracted position. In a sixth example of the shift fork system, optionally including one or more or each of the first through fifth examples, the hub is splined to a shaft. In a seventh example of the shift fork system, optionally including one or more or each of the first through sixth examples, when the clutch assembly is transitioned between engagement and disengagement, an axial position of a sliding sleeve changes with regard to the hub, wherein the sliding sleeve is included in the clutch assembly. In an eighth example of the shift fork system, optionally including one or more or each of the first through seventh examples, the clutch assembly is a synchronizer assembly. In a ninth example of the shift fork system, optionally including one or more or each of the first through eighth examples, the clutch assembly includes a plurality of detents in the hub and wherein one or more detent components are positioned in each of the plurality of detents. In a tenth example of the shift fork system, optionally including one or more or each of the first through ninth examples, the one or more detent components includes a spring and a ball bearing. In another example, the shift fork body may include multiple fork guide interfaces which each include a notch profiled to mate with a head of the corresponding fork guide.

The disclosure also provides support for a shift fork system which comprises a plurality of fork guides removably coupled to a shift fork body, wherein each fork guide is configured to in an extended position mate with a clutch assembly and enable the clutch assembly to be adjusted by the plurality of fork guides, and in a retracted position decouple from the clutch assembly, and a plurality of attachment devices which are each configured to retain one of the plurality of fork guides in their extended position. In a first example of the shift fork system, the plurality of attachment devices are shoulder bolts that are profiled to mate with grooves in stems of the plurality of fork guides. In a second example of the shift fork system, optionally including the first example, the shift fork body is formed as a single piece. In a third example of the shift fork system, optionally including one or both of the first and second examples, the clutch assembly includes a plurality of neutral detents in a hub and wherein a spring loaded ball bearing is positioned in each of the plurality of neutral detents. In a fourth example of the shift fork system, optionally including one or more or each of the first through third examples, the plurality of fork guides mate with an outer recess in a sliding sleeve in the clutch assembly, and an inner surface of the sliding sleeve includes a plurality of splines that mate with splines in the hub. In a fifth example of the shift fork system, optionally including one or more or each of the first through fourth examples, the shift fork system further comprises a controller including instructions that when executed by a processor cause the controller to move the shift fork body to adjust the clutch assembly into an engaged position. Further, in one example. the shift fork body may include multiple fork guide interfaces which each include a notch profiled to mate with a head of the corresponding fork guide.

The disclosure also provides support for a method for assembling a shift fork system, which comprises assembling a clutch assembly that includes a hub and a sliding sleeve, mating the clutch assembly with a shaft, urging a plurality of fork guides into an extended position to mate with the clutch assembly, and fixing the plurality of fork guides in the extended position by installing a plurality of attachment devices into a shift fork body and the plurality of fork guides. In a first example of the method, the plurality of attachment devices are shoulder bolts. In a second example of the method, optionally including the first example, installing the plurality of attachment devices includes mating the shoulder bolts with circumferential grooves in stems of the plurality of fork guides.

FIGS. 2-9 and 11-13 are drawn approximately to scale, although other relative component dimensions may be used, in other examples. FIGS. 1-9 and 11-13 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Further, elements offset from one another and coaxial to one another may be referred to as such.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of electric motors and/or internal combustion engines as well as different systems. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range, unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A shift fork system, comprising:
a plurality of fork guides adjustably coupled to a shift fork body;
a plurality of attachment devices which are each configured to releasably fix a position of one of the plurality of fork guides in relation to a clutch assembly;
wherein each fork guide, in a first position, is configured to mate with and adjust the clutch assembly;
wherein the clutch assembly includes a hub; and
wherein the plurality of attachment devices mate with grooves in stems of the plurality of fork guides in a configuration that fixes the position of the plurality of fork guides in relation to the clutch assembly wherein the plurality of attachment devices are shoulder bolts, wherein the grooves extend around at least portions of circumferences of the stems of the plurality of fork guides; and wherein shanks of the plurality of attachment devices are positioned at least partially within the grooves in the stems of the plurality of fork guides when they are in the configuration that fixes the position of the plurality of fork guides in relation to the clutch assembly.

2. The shift fork system of claim 1, wherein heads of the plurality of fork guides mate with an outer recess in the clutch assembly.

3. The shift fork system of claim 1, wherein the shift fork body forms a monolithic structure.

4. The shift fork system of claim 1, wherein the plurality of fork guides are designed to radially extend and retract in relation to the shift fork body.

5. The shift fork system of claim 1, wherein:
when the plurality of fork guides are mated with a recess in the clutch assembly, the plurality of fork guides are in the first position which is an extended position; and
when the plurality of fork guides are decoupled from the recess of the clutch assembly, the plurality of fork guides are in a retracted position.

6. The shift fork system of claim 1, wherein the shift fork body includes multiple fork guide interfaces which each include a notch profiled to mate with a head of the corresponding fork guide.

7. The shift fork system of claim 1, wherein, when the clutch assembly is transitioned between engagement and disengagement, an axial position of a sliding sleeve changes with regard to the hub, wherein the sliding sleeve is included in the clutch assembly.

8. The shift fork system of claim 1, wherein the clutch assembly is a synchronizer assembly.

9. The shift fork system of claim 8, wherein the clutch assembly includes a plurality of detents in the hub and wherein one or more detent components are positioned in each of the plurality of detents.

10. The shift fork system of claim 9, wherein the one or more detent components includes a spring and a ball bearing.

11. A shift fork system, comprising:
a plurality of fork guides removably coupled to a shift fork body, each fork guide having a stem and a groove extending around at least a portion of a circumference of the stem;
wherein each fork guide is configured to:
in an extended position mate with a clutch assembly and enable the clutch assembly to be adjusted by the plurality of fork guides; and
in a retracted position decouple from the clutch assembly; and
a plurality of attachment devices, each attachment device having a shank,
wherein the shanks of the attachment devices are positioned at least partially into the grooves of the fork guides to retain the plurality of fork guides in their extended positions.

12. The shift fork system of claim 11,
wherein the plurality of attachment devices are shoulder bolts; and
wherein the shift fork body includes a plurality of shift fork arms, each arm including a hole profiled to receive an attachment device, and each hole extending along an axis perpendicular to a longitudinal axis of a stem of a fork guide.

13. The shift fork system of claim 11, wherein the shift fork body is formed as a single piece.

14. The shift fork system of claim 11, wherein the clutch assembly includes a plurality of neutral detents in a hub and wherein a spring loaded ball bearing is positioned in each of the plurality of neutral detents.

15. The shift fork system of claim 14, wherein:
the plurality of fork guides mate with an outer recess in a sliding sleeve in the clutch assembly; and
an inner surface of the sliding sleeve includes a plurality of splines that mate with splines in the hub.

16. The shift fork system of claim 11, wherein the shift fork body includes multiple fork guide interfaces which each include a notch profiled to mate with a head of the corresponding fork guide.

17. A method for assembling a shift fork system, comprising:
assembling a clutch assembly that includes a hub and a sliding sleeve;
mating the clutch assembly with a shaft;
urging a plurality of fork guides into an extended position to mate with the clutch assembly, each fork guide having a stem and a groove extending around at least a portion of a circumference of the stem; and
fixing the plurality of fork guides in the extended position by installing a plurality of attachment devices into a shift fork body and the plurality of fork guides, each attachment device having a shank, and the shanks of the attachment devices being positioned at least partially into the grooves of the stems of the fork guides to fix the plurality of fork guides in the extended position.

18. The method of claim 17, wherein the plurality of attachment devices are shoulder bolts.

19. The method of claim 18, wherein installing the plurality of attachment devices includes mating the shoulder bolts with the grooves in the stems of the plurality of fork guides.

* * * * *